(12) United States Patent
Cipriano

(10) Patent No.: US 11,596,125 B2
(45) Date of Patent: *Mar. 7, 2023

(54) PET BED COVERING SYSTEM

(71) Applicant: Emiliano Cipriano, Marina Del Rey, CA (US)

(72) Inventor: Emiliano Cipriano, Marina Del Rey, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/147,273

(22) Filed: Jan. 12, 2021

(65) Prior Publication Data

US 2021/0127628 A1  May 6, 2021

Related U.S. Application Data

(63) Continuation of application No. 16/096,037, filed as application No. PCT/US2017/029444 on Apr. 25, 2017, now Pat. No. 10,893,657.

(60) Provisional application No. 62/327,848, filed on Apr. 26, 2016.

(51) Int. Cl.
| | | |
|---|---|---|
| *A01K 1/00* | (2006.01) | |
| *A01K 1/035* | (2006.01) | |
| *A01K 29/00* | (2006.01) | |

(52) U.S. Cl.
CPC ............ *A01K 1/0353* (2013.01); *A01K 1/035* (2013.01); *A01K 29/00* (2013.01)

(58) Field of Classification Search
CPC ....... A01K 1/0353; A01K 1/035; A01K 29/00
USPC .......................................................... 119/28.5
See application file for complete search history.

(56) References Cited

U.S. PATENT DOCUMENTS

| | | | | |
|---|---|---|---|---|
| 5,010,843 | A | * | 4/1991 | Henry .................. A01K 1/0353 119/28.5 |
| 5,144,911 | A | * | 9/1992 | Moore ................. A01K 1/0353 119/28.5 |
| 2002/0104166 | A1 | | 8/2002 | Mangiaracina |
| 2003/0135924 | A1 | | 7/2003 | Chuang |
| 2007/0044722 | A1 | | 3/2007 | West |
| 2007/0062456 | A1 | | 3/2007 | Pace |
| 2008/0041318 | A1 | * | 2/2008 | McCabe .............. A01K 1/0353 119/28.5 |
| 2008/0066686 | A1 | * | 3/2008 | Lockwood ............. A01K 1/033 119/28.5 |
| 2010/0313824 | A1 | * | 12/2010 | Northrop ............. A01K 1/0254 119/500 |
| 2011/0290834 | A1 | * | 12/2011 | Pelz ..................... A01K 1/0353 224/259 |

(Continued)

OTHER PUBLICATIONS

International Preliminary Report on Patentability dated Nov. 8, 2018 for PCT International Patent Application No. PCT/US2017/029444 (6 pgs).

(Continued)

*Primary Examiner* — Richard T Price, Jr.
(74) *Attorney, Agent, or Firm* — Snell & Wilmer LLP

(57) ABSTRACT

A pet bed covering system is disclosed. The system may include a pet bed and a pet bed cover. A pet bed cover may have an outer sleeve that wraps about the pet bed with attachment features whereby the pet bed cover may be retained in position about the pet bed. The outer sleeve may have a pet opening edge whereby a pet may enter and exit from the pet bed. In this manner, the pet may be kept warm while resting on the pet bed.

20 Claims, 12 Drawing Sheets

(56) References Cited

U.S. PATENT DOCUMENTS

| | | | | |
|---|---|---|---|---|
| 2012/0118239 A1* | 5/2012 | Jacquart | ............... | A01K 1/0353 |
| | | | | 119/28.5 |
| 2012/0291712 A1* | 11/2012 | Wallace | ................ | B65D 25/16 |
| | | | | 119/167 |
| 2012/0312238 A1* | 12/2012 | Morales | ................ | A47C 31/11 |
| | | | | 119/28.5 |
| 2013/0180463 A1* | 7/2013 | Messner | .............. | A01K 1/0353 |
| | | | | 119/28.5 |
| 2013/0247828 A1* | 9/2013 | Tedaldi | ................ | A01K 1/0353 |
| | | | | 119/28.5 |
| 2013/0318712 A1 | 12/2013 | Cordoves et al. | | |
| 2015/0007776 A1* | 1/2015 | Dees | .................... | A01K 1/0353 |
| | | | | 119/28.5 |
| 2015/0032014 A1* | 1/2015 | Ghosh | .................... | A61B 5/282 |
| | | | | 607/9 |
| 2016/0057970 A1* | 3/2016 | Lowery | ................ | A01K 1/0353 |
| | | | | 119/28.5 |
| 2016/0198675 A1* | 7/2016 | Liu | ...................... | A01K 1/0353 |
| | | | | 119/28.5 |

OTHER PUBLICATIONS

PCT International Search Report and Written Opinion cited in Patent Application No. PCT/US2017/029444, dated Jul. 13, 2017 (7 pgs).

* cited by examiner

PET BED COVERING SYSTEM

CROSS-REFERENCE TO RELATED APPLICATIONS

This application is a continuation of U.S. patent application Ser. No. 16/096,037, entitled, "PET BED COVERING SYSTEM," filed Oct. 24, 2018, which is a national stage entry of, and claims priority to, International Patent Cooperation Treaty (PCT) Application Serial No. PCT/US2017/029444 entitled "PET BED COVERING SYSTEM, filed on Apr. 25, 2017, which claims priority to and the benefit of, U.S. Provisional Application Ser. No. 62/327,848 entitled "PET BED COVERING SYSTEM" filed on Apr. 26, 2016, the contents of which are hereby incorporated herein by reference in their entirety for any purpose.

FIELD

The present disclosure relates generally to a blanket, and more specifically to a blanket for covering a pet bed.

BACKGROUND

Pet beds provide comfortable resting and sleeping places for pets, such as dogs. However, a pet may become cold when resting on a pet bed. While a pet owner may place a blanket over a cold pet, the blanket often becomes displaced through the movement of the pet and must be placed by an owner atop the pet every time the pet leaves and returns to the bed. As such, a pet may become cold unless frequently attended by an owner.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

A pet bed cover is disclosed. The pet bed cover may include an outer sleeve including a pet opening edge configured to permit entry and exit of a pet, an outward side including outward side attachment features, and an inward side including inward side attachment features. In various embodiments, at least a portion of the outward side attachment features mechanically interface with at least a portion of the inward side attachment features whereby the pet bed cover is configured to wrap about a pet bed in substantially fixed position relative to the pet bed.

A pet bed cover is provided. The pet bed cover may include an outer sleeve including a planar structure bendable to enwrap a pet bed and including a pet opening edge configured to permit entry and exit of a pet from between the outer sleeve and the pet bed, an outer side including outward side attachment features, and an inner side including inward side attachment features. In various embodiments, at least a portion of the outward side attachment features mechanically interface with at least a portion of the inward side attachment features whereby the pet bed cover is configured to wrap about the pet bed in substantially fixed position relative to the pet bed.

In various embodiments, the outer sleeve further includes a central bed covering portion with a centrally disposed region of the outer sleeve arranged to provide cover to a pet bed, a first wing portion and a second wing portion extending from opposite sides of the outer sleeve and extending around the pet, and an end wrap portion extending opposite the pet opening edge and configured to insulate an aft area of a pet bed.

In various embodiments, the end wrap portion further includes elastic strips configured to cinch a distal edge of the end wrap portion encircling the aft portion of the end wrap portion at least one of under and around an aft end of the pet bed to form a closure.

In various embodiments, the pet opening edge includes a comfort overlay including at least one of a fleece, artificial fleece, and blanket covering at least a part of the pet opening edge and overlapping from a portion of the pet opening edge facing inwardly toward the pet bed to a portion of the pet opening edge facing outwardly from the pet bed.

In various embodiments, the pet opening edge includes a first reinforcement band having a strengthening material coextensive with an edge of at least one of the central bed covering portion, the first wing portion, and the second wing portion and configured to enhance a durability of the pet opening edge.

In various embodiments, the pet opening edge further includes a first reinforcement band having a strengthening material to enhance a durability of the pet opening edge and disposed coextensive with an edge of at least one of the central bed covering portion and the first wing portion, or the central bed covering portion and the second wing portion.

In various embodiments, the outward side attachment features include at least one outward side fastener strip, and the inward side attachment features include at least one inward side fastener strip. In various embodiments, the at least one outward side fastener strip is selectably attachable to the at least one inward side fastener strip.

In various embodiments, the inward side fastener strip is oriented to exhibit a relative angle relative to the pet opening edge and adjusting a degree of overlap of the inward side fastener strip and the outward side fastener strip adjusts a conical tightening of the pet bed without tensioning the pet opening edge.

In various embodiments, the outward side attachment features include a plurality of outward side fastener strips, and the inward side attachment features include a plurality of inward side fastener strips. In various embodiments, at least one outward side fastener strip is selectably attachable to at least two of the plurality of inward side fastener strips, wherein the pet bed cover is configurable to fit different size pet beds.

The pet bed cover may also have boning disposed along the pet opening edge. The boning may be at least one of fabric covered plastic, rigilene, nylon, and wire.

The pet bed cover may have joinder bonding which may be stitching affixing the central bed covering portion and the first wing portion together. The pet bed cover may have boning whereby the joinder bonding of the central bed covering portion and the first wing portion is stiffened.

A method of making a pet bed cover is also provided. The method may include providing an outer sleeve including a planar structure bendable to enwrap a pet bed. Providing the outer sleeve further may include providing a pet opening edge configured to permit entry and exit of a pet from between the outer sleeve and the pet bed, providing an outer side including outward side attachment features, and providing an inner side including inward side attachment features. In various instances, at least a portion of the outward side attachment features mechanically interface with at least a portion of the inward side attachment features whereby the pet bed cover is configured to wrap about the pet bed in substantially fixed position relative to the pet bed.

The method of making a pet bed cover may also include further aspects. For instance, the providing the outer sleeve may include providing a central bed covering portion including a centrally disposed region of the outer sleeve arranged to provide cover to a pet bed, providing a first wing portion and a second wing portion extending from opposite sides of the outer sleeve and extending around the pet, and providing an end wrap portion extending opposite the pet opening edge and configured to insulate an aft area of a pet bed.

In various embodiments, providing the end wrap portion further includes providing an elastic strip configured to cinch a distal edge of the end wrap portion encircling the aft portion of the end wrap portion at least one of under and around an aft end of the pet bed to form a closure.

In various embodiments, providing the pet opening edge includes providing a comfort overlay including at least one of a fleece, artificial fleece, and blanket covering at least a part of the pet opening edge and overlapping from a portion of the pet opening edge facing inwardly toward the pet bed to a portion of the pet opening edge facing outwardly from the pet bed.

In various embodiments, providing the pet opening edge further includes providing a first reinforcement band including a strengthening material to enhance a durability of the pet opening edge and disposed coextensive with an edge of at least one of the central bed covering portion and the first wing portion, or the central bed covering portion and the second wing portion, The method of making a pet bed cover may also include wherein providing the outward side attachment features includes providing at least one outward side fastener strip, wherein providing the inward side attachment features includes providing at least one inward side fastener strip, and wherein the at least one outward side fastener strip is selectably attachable to the at least one inward side fastener strip.

In various embodiments, the method of making a pet bed cover may include wherein providing the inward side fastener strip includes orienting the inward side fastener strip to exhibit a relative angle relative to the pet opening edge wherein adjusting a degree of overlap of the inward side fastener strip and the outward side fastener strip adjusts a conical tightening of the pet bed without tensioning the pet opening edge.

Finally, a method of using a pet bed covering system is provided. The method of using a pet bed covering system may include lowering a pet bed cover atop a pet bed, wrapping the pet bed cover about the pet bed, and permitting a pet to enter the pet bed covering system and be disposed between the pet bed and a portion of the pet bed cover. In various instances, the pet bed cover includes an outer sleeve having a planar structure bendable to enwrap a pet bed and including a pet opening edge configured to permit entry and exit of a pet from between the outer sleeve and the pet bed, an outer side with outward side attachment features, and an inner side with inward side attachment features. In various instances, at least a portion of the outward side attachment features mechanically interface with at least a portion of the inward side attachment features whereby the pet bed cover is configured to wrap about the pet bed in substantially fixed position relative to the pet bed.

The method of using the pet bed covering system may further include aspects wherein the pet bed cover includes a central bed covering portion with a centrally disposed region of the outer sleeve arranged to provide cover to a pet bed, a first wing portion and a second wing portion extending from opposite sides of the outer sleeve and extending around the pet, and an end wrap portion extending opposite the pet opening edge and configured to insulate an aft area of a pet bed. In various instances the end wrap portion further includes elastic strips configured to cinch a distal edge of the end wrap portion encircling the aft portion of the end wrap portion at least one of under and around an aft end of the pet bed to form a closure. In various instances, the pet opening edge further includes a comfort overlay with at least one of a fleece, artificial fleece, and blanket covering at least a part of the pet opening edge and overlapping from a portion of the pet opening edge facing inwardly toward the pet bed to a portion of the pet opening edge facing outwardly from the pet bed, and a first reinforcement band including a strengthening material to enhance a durability of the pet opening edge and disposed coextensive with an edge of at least one of the central bed covering portion and the first wing portion, or the central bed covering portion and the second wing portion. In various instances the outward side attachment features include at least one outward side fastener strip. In various instances, the inward side attachment features include at least one inward side fastener strip. In various instances, the at least one outward side fastener strip is selectably attachable to the at least one inward side fastener strip. In various instances the inward side fastener strip is oriented to exhibit a relative angle relative to the pet opening edge wherein adjusting a degree of overlap of the inward side fastener strip and the outward side fastener strip adjusts a conical tightening of the pet bed without tensioning the pet opening edge. In various instances, the pet bed further includes boning disposed along the pet opening edge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

Figure 1:
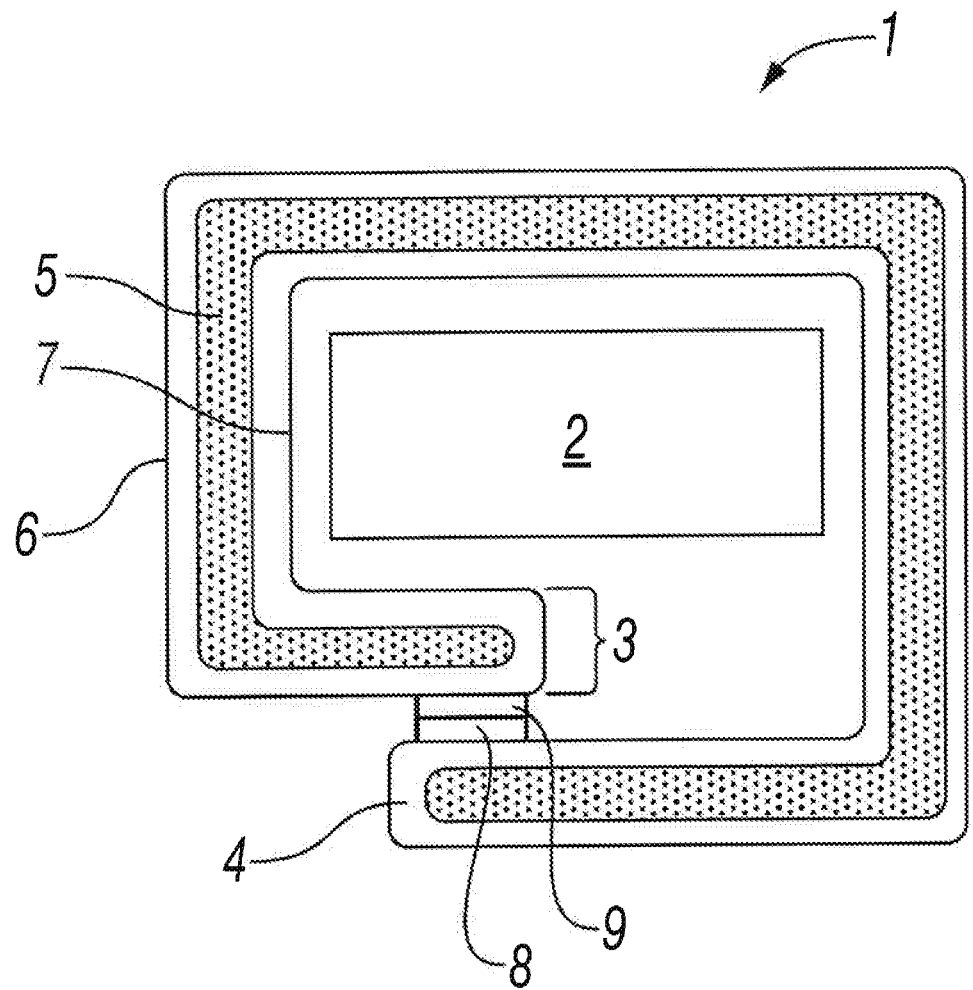
FIGS. 1-14 illustrate various aspects of a pet bed cover, according to various embodiments.
Figure 2:
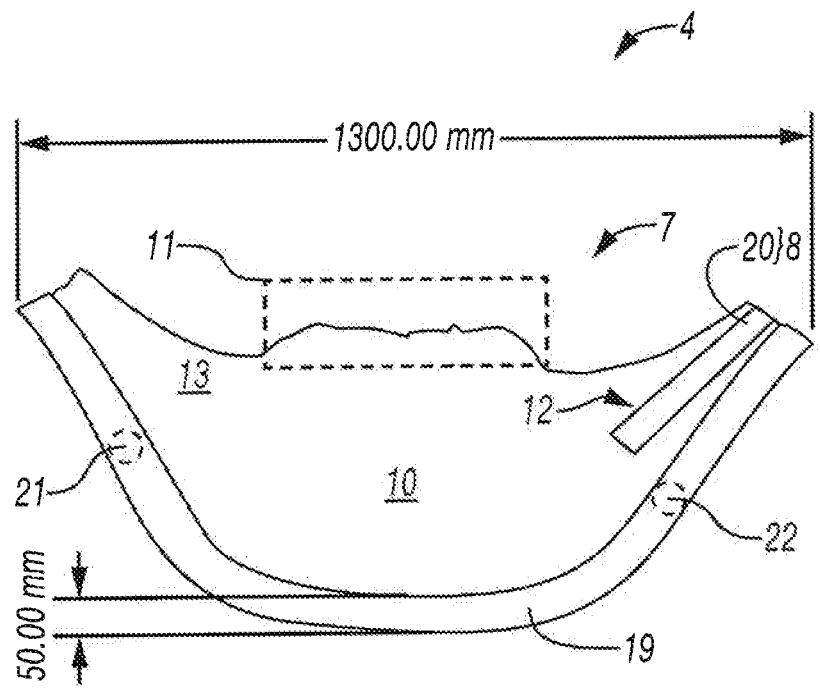
Figure 3:
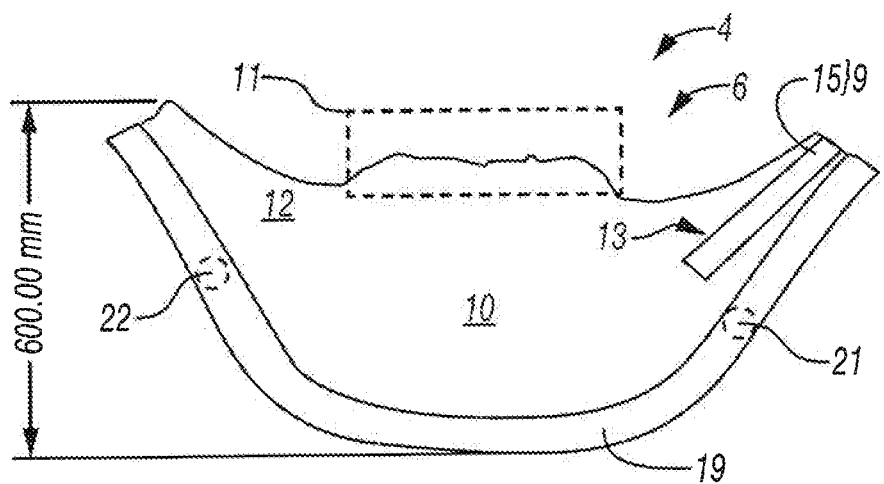
Figure 4:
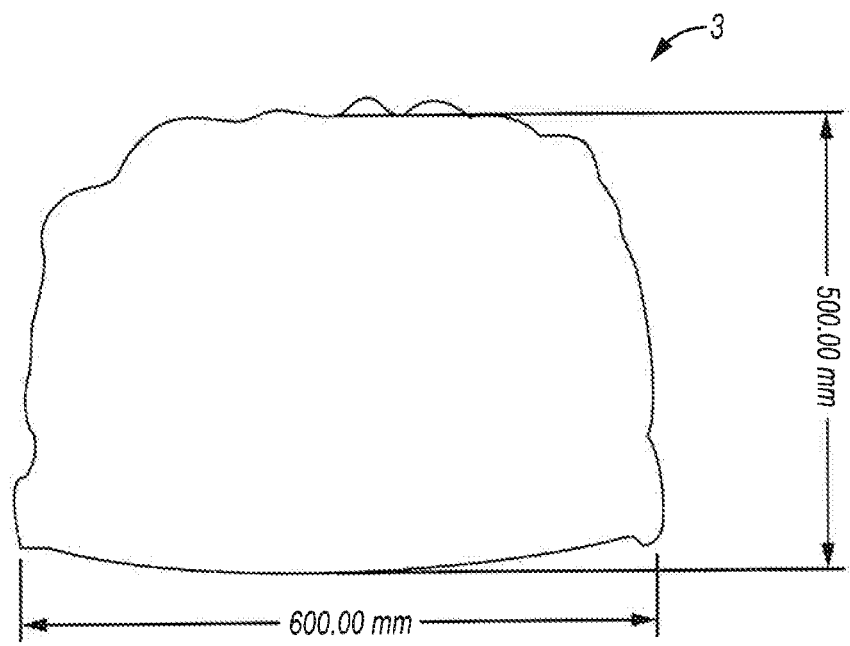
Figure 5:
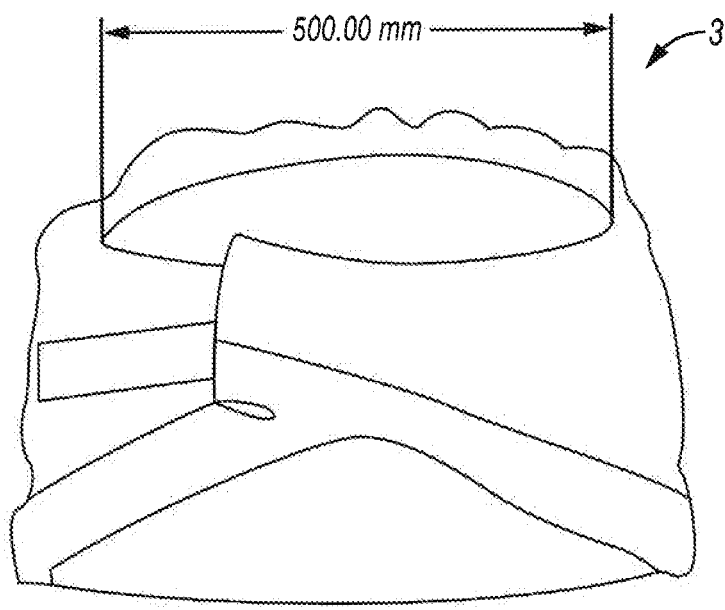
Figure 6:
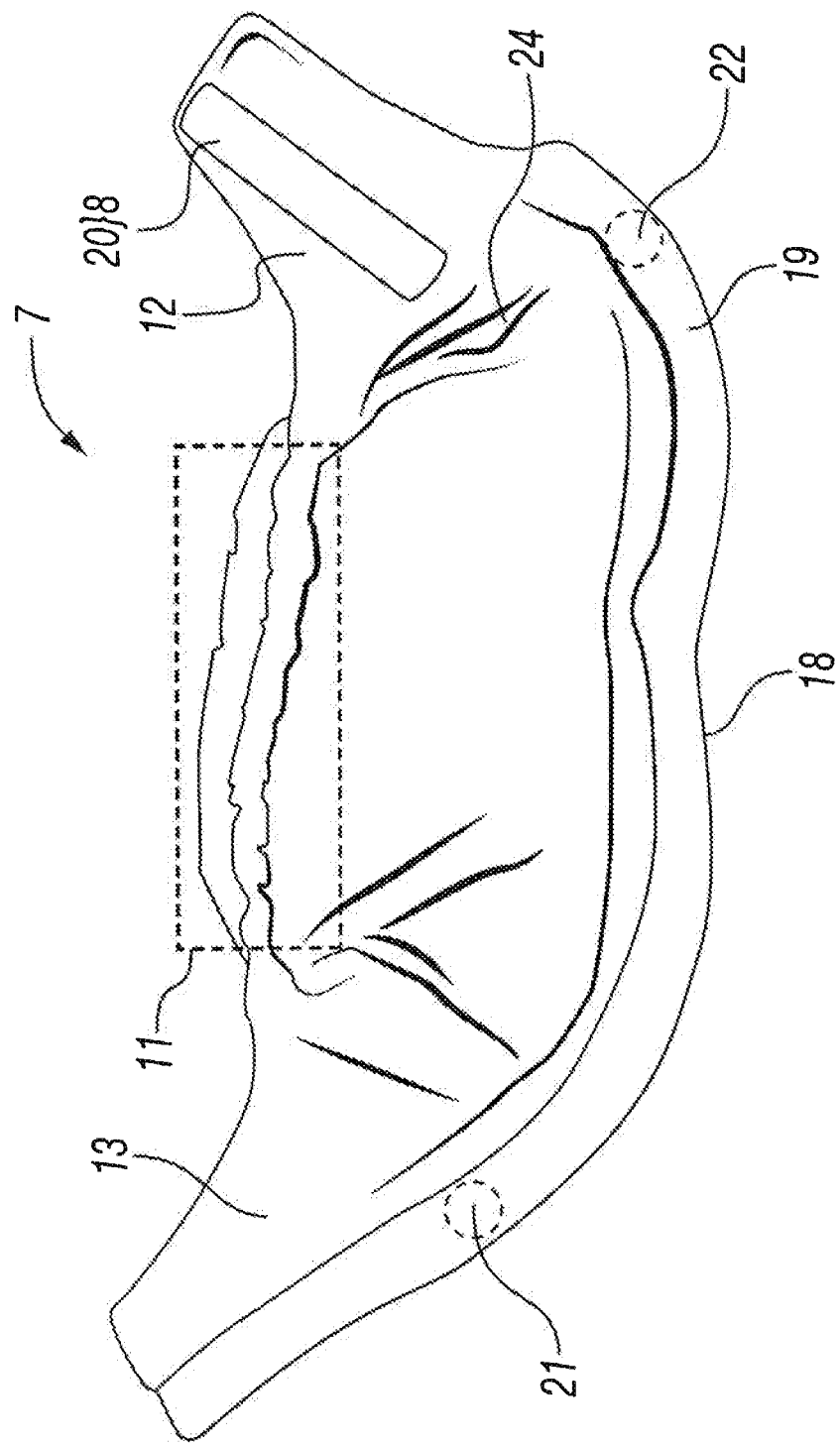
Figure 7:
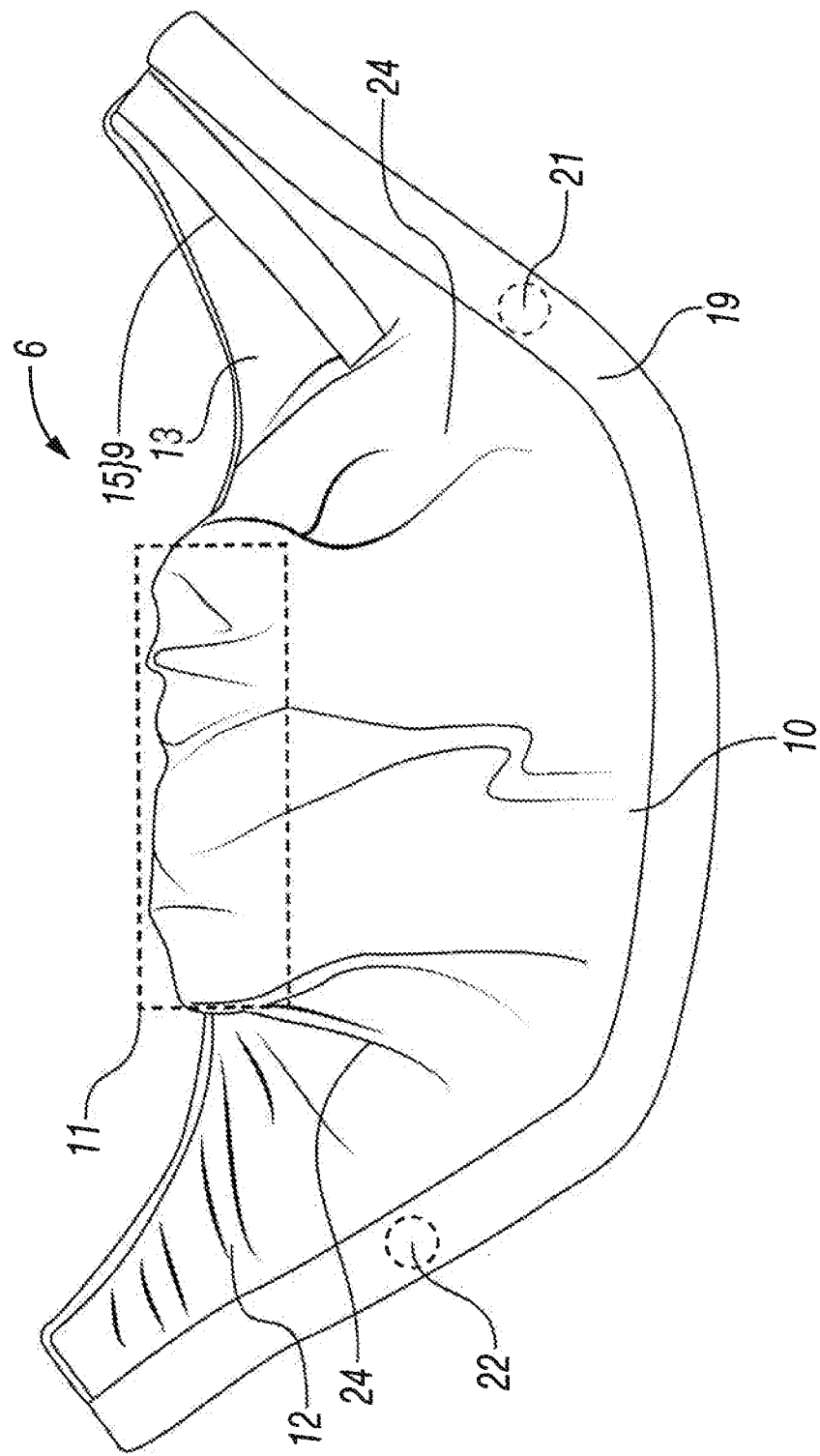
Figure 8:
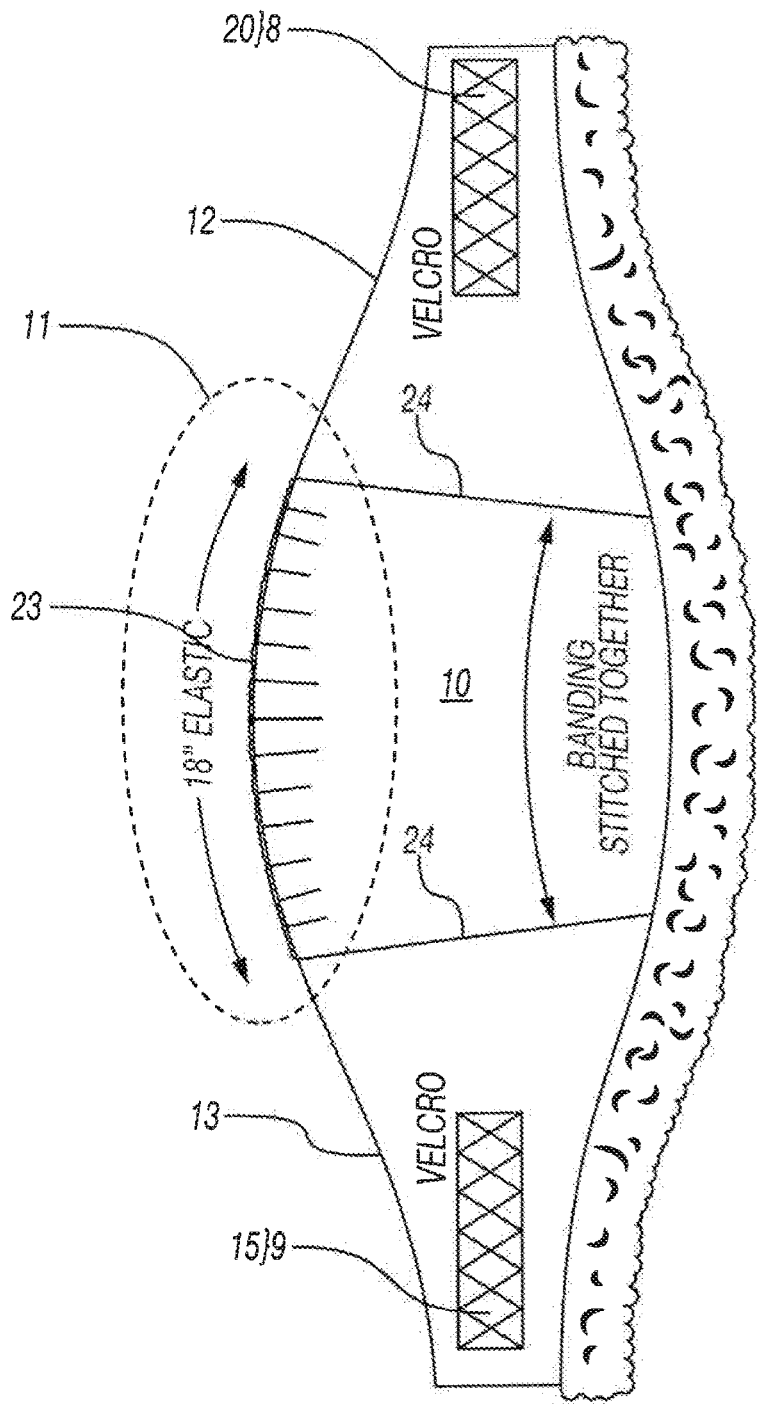
Figure 9:
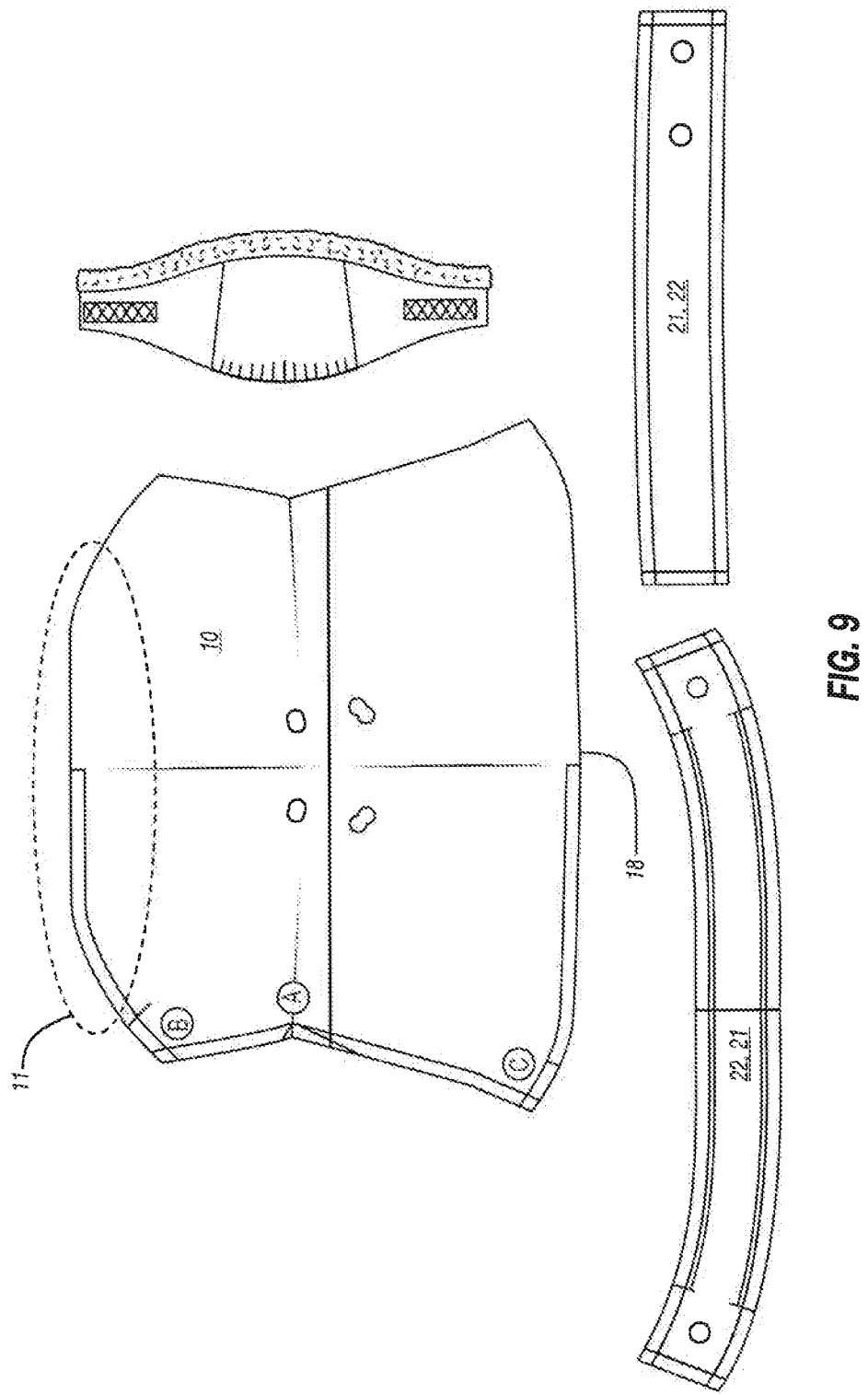
Figure 10:
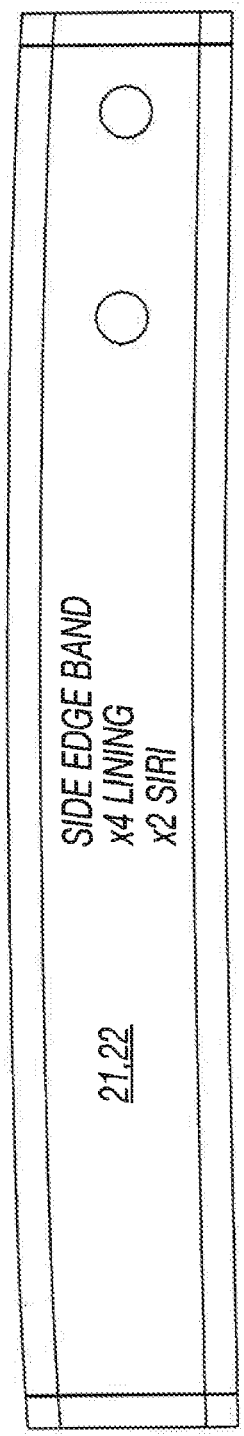
Figure 11:
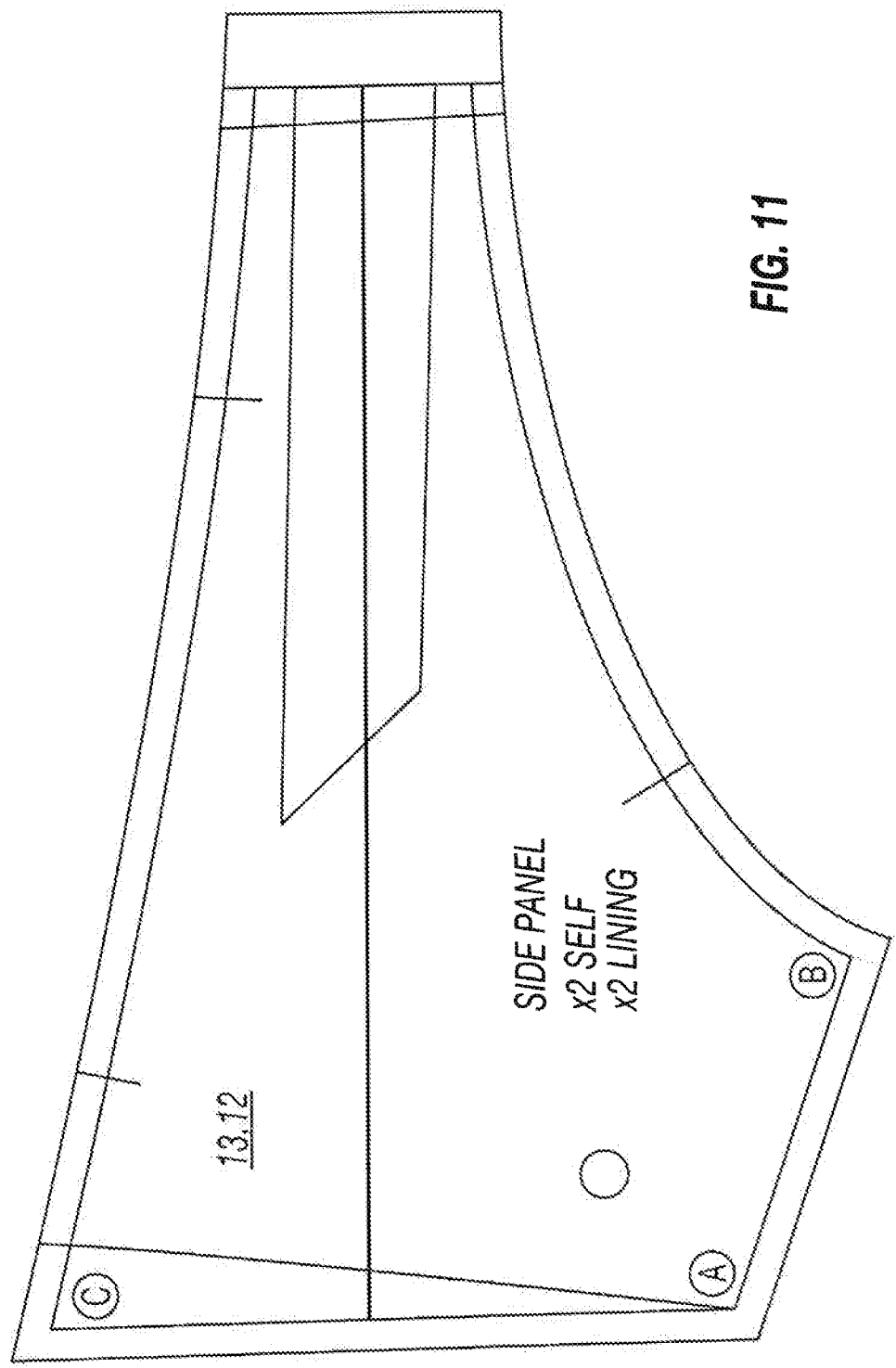
Figure 12:
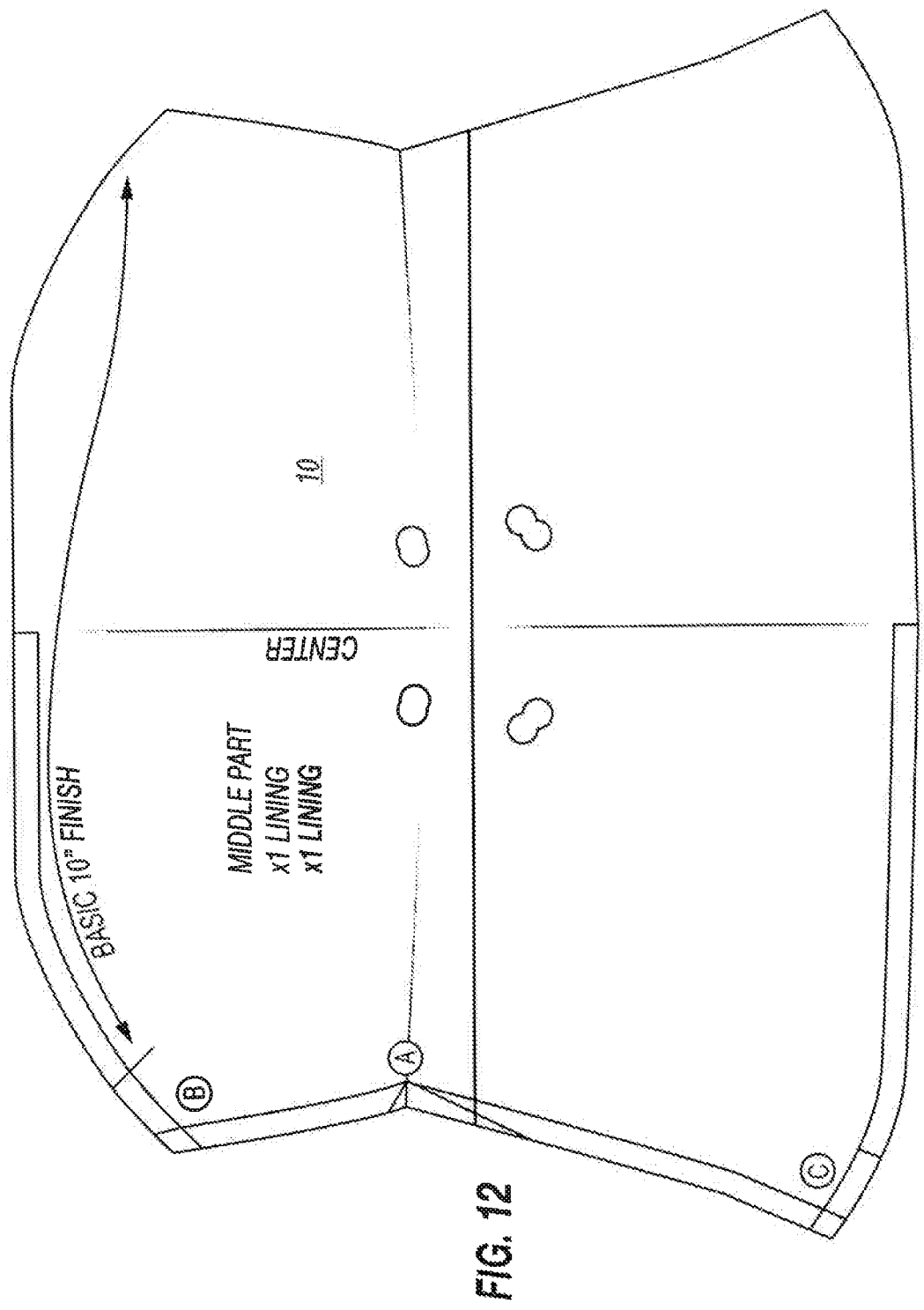
Figure 13:
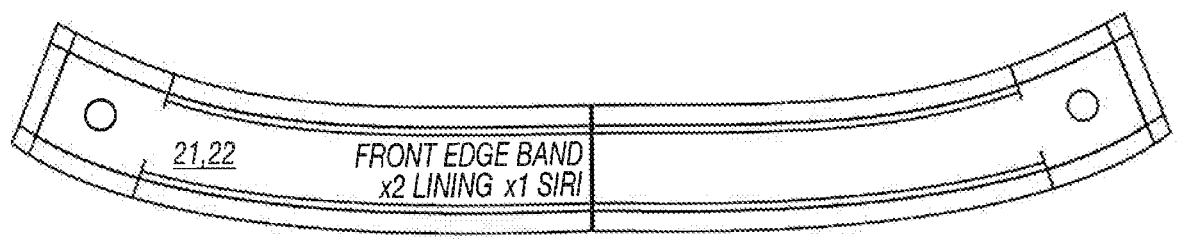
Figure 14:
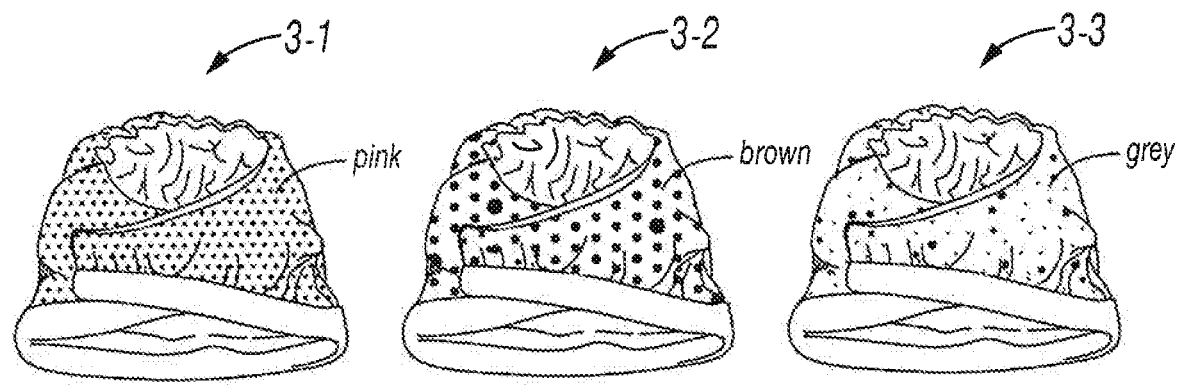

With reference to FIGS. 1-14, and particularly FIG. 1, a pet bed covering system 1 may comprise a pet bed 2 and a pet bed cover 3 wrapped around the pet bed 2. The pet bed cover 3 may provide insulation such as to trap heat, and may block wind, such as drafts, providing a warm environment wherein a pet may rest.

The pet bed cover 3 may comprise an outer sleeve 4 and an inner insulation 5. The outer sleeve 4 may comprise a durable, warmth promoting surface, such as may be in contact with the pet's skin, and such as may provide various decorative and cosmetic features, such as written phrases, visual patterns, and the like. The inner insulation 5 may comprise a relatively thermally insulative material, such as down feathers, or synthetic fibers, or natural fibers, or a combination of synthetic and natural fibers, or non-fibrous material, such as wind-blocking layer(s) or any material and/or material configuration arranged to promote warmth.

The outer sleeve 4 may comprise numerous additional features. For instance, the outer sleeve 4 may retain and protect the inner insulation 5, and may have various aspects configured to facilitate pet entry and exit from the pet bed covering system 1, as well as covering(s) to further promote warmth. For example, portions of the outer sleeve 4 may be durable such as to resist soiling, liquids, and clawing/chewing by pets, and other portions may be soft and warmth promoting. For instance, the portions facing a pet bed may be covered in fleece, or artificial fleece, or have an integrated blanket and/or the like.

The outer sleeve 4 may comprise an outer side 6, an inner side 7, a pet opening edge 18, a central bed covering portion 10, a first wing portion 13, a second wing portion 12, and an end wrap portion 11. One or more portion may be joined together by joinder bonding 24, which may comprise gluing, stitching, welds, and/or the like. In various embodiments, joinder bonding 24 may be staggered, such as to avoid the coincidence of various joinder bonds 24 of various aspects at similar locations, in this manner, enhancing the strength and durability of the pet bed cover 3.

The outer sleeve 4 may wrap about the pet bed 2, and may have overlapping ends. The outer sleeve 4 may comprise a generally planar material structure having a generally planar inner insulation 5 disposed internally therein. The outer sleeve 4 may comprise any material, such as synthetic fibers, such as polyester, natural fibers, such as cotton, petroleum products such as plastic, and the like. The outer sleeve 4 may comprise different sections, such as wings, which may interface with conjugate wings such as to retain the outer sleeve 4 in position. Thus, a central bed covering portion 10 of the outer sleeve 4 may comprise a centrally disposed planar region of the outer sleeve 4 arranged to provide cover to a pet bed 2. Extending from opposite sides of the outer sleeve 4, a first wing portion 13 and a second wing portion 12 may extend around the pet bed 2 and may interface beneath the pet bed 2, or to the side, or atop, or at any other position, whereby the pet bed 2 is encircled or otherwise held in connection to the pet bed cover 3. The outer sleeve 4 may also have an end wrap portion 11 extending opposite the pet opening edge 18 of the outer sleeve 4, and providing insulative protection to the aft area of the pet bed 2, such as where a draft may leak through, and further wrapping about the aft end of the pet bed 2. The end wrap portion 11 may include one or more elastic strip 23. The elastic strip(s) 23 may "cinch" a distal edge (relative to the central bed covering portion 10) of the end wrap portion 11, encouraging it to encircle under and/or about the aft area of the pet bed 2 and form a closure about the aft end of the pet bed 2. The pet opening edge 18 may comprise an open edge whereby the pet is permitted entry between the pet bed cover 3 and the pet bed 2 so as to rest atop the pet bed 2 and under a portion of the pet bed cover 3. In various embodiments, the pet opening edge 18 may be curved, or otherwise shaped to facilitate ready entry and exit by the pet.

As a generally planar structure, the outer sleeve 4 may have an outward side 6 comprising an outward facing planar side and an inward side 7 comprising an inward facing planar side, relative to the pet bed 2. As the outer sleeve 4 is wrapped about the pet bed 2, the planar structure may become a structure having a complex curvature. As such, the outward side 6 and the inward side 7 may be brought into mechanical communication by wrapping the pet bed cover 3 about a pet bed 2.

The outward side 6 may comprise outward side attachment features 9 and the inward side 7 may comprise inward side attachment features 8. As the outward side 6 and the inward side 7 are brought into mechanical communication, the outward side attachment features 9 and the inward side attachment features 8 may interact, facilitating a selectable retention of the pet bed cover 3 about the pet bed 2.

The outward side attachment features 9 may comprise outward side fastener strips 15. Similarly, the inward side attachment features 8 may include inward side fastener strips 20.

The outward side fastener strip 15 may comprise any fastener strip corresponding to an inward side fastener strip 20 comprising a conjugate fastener strip. For example, corresponding strips of hook-and-loop fastener material may be used. As the pet bed cover 3 is wrapped about the pet bed 2 and the outward side 6 and inward side 7 come into mechanical communication, the outward side fastener strips 15 and the inward side fastener strips 20 may be mated together to retain the pet bed cover 3 in position. Moreover, the outward side fastener strip 15 and inward side fastener strip 20 may be oriented so as to exhibit a relative angle relative to the pet opening edge 18 so that by adjusting the degree of overlap of the fastener strips, relative tightening of the pet bed cover 3 about the pet bed 2 may occur conically, so that the pet bed cover 3 may be more or less snuggly secured about the pet bed 2, but without a corresponding tensioning of the pet opening edge 18, thus permitting ready access by a pet to the pet bed 2 via the pet opening edge 18. Moreover, the tensioning of the pet opening edge 18 may be separately adjusted from the tensioning of the pet bed cover 3 about the pet bed 2, by virtue of the relative angle of the outward side fastener strip 15 and the inward side fastener strip 20 relative to one another, and relative to the pet opening edge 18. In further embodiments, various fastener strips may be variously disposed about the pet bed cover 3, such as to permit different fastening arrangements to fit pet beds 2 of different sizes and shapes.

With specific reference now to the pet opening edge 18, the pet opening edge 18 may comprise further features, for example, a comfort overlay 19. A comfort overlay 19 may comprise a layer covering all or part of the pet opening edge 18, and overlapping from the portion of the pet opening edge 18 facing inwardly toward the pet bed 2, to the portion of the pet opening edge 18 facing outwardly from the pet bed 2. A comfort overlay 19 may comprise fleece, or artificial fleece, or have an integrated blanket, or comprise any material configured to ease the entry of a pet past the pet opening edge 18, to insulate the space between the pet bed cover 3 and pet bed 2, and/or the like.

The pet opening edge 18 may further comprise one or more reinforcement band, for instance, a first reinforcement band 21 and a second reinforcement band 22. A first reinforcement band 21 and a second reinforcement band 22 may comprise a strengthening material configured to enhance the durability of the pet bed cover 3 at areas prone to wear, such as the pet opening edge 18. The first reinforcement band 21 and/or second reinforcement band 22 may be covered over by other aspects of the pet bed cover 3, for instance, lying underneath a comfort overlay 19 and/or the like. The first reinforcement band 21 and/or second reinforcement band 22 may extent coextensive with the edge of one or more aspect of the pet bed cover 3, such as the central bed covering portion 10, the first wing portion 13 and the second wing portion 12. In various embodiments, the first reinforcement band 21 lies coextensive with an edge of the first wing portion 13 and a portion of the edge of the central bed covering portion 10 and the second reinforcement band 22 lies coextensive with an edge of the second wing portion 12 and a portion of the edge of the central bed covering portion 10.

Furthermore, the pet opening edge 18 and/or the joinder bonding 24 may comprise boning. Boning may comprise a stiffening and/or spring fabric, or plastic, or fabric covered plastic, or rigilene, or nylon, or wire, or any material structured to add support whereby the pet opening edge 18 is maintained in an open orientation relative to the underlying pet bed so that the pet may be afforded easy entry and exit. In various embodiments, multiple bonings are implemented. For example, each boning may run along an edge of one or more of the first wing portion 13, the second wing portion 12, and the central bed covering portion 10. In various embodiments, the first reinforcement band 21 and second reinforcement band 22 comprise the boning, whereas in further embodiments, the boning is separate from the reinforcement band. The boning may comprise one stiffening aspect, or two stiffening aspects or any number of stiffening aspects. For example, in various embodiments a first boning, a second boning, and a third boning may be included. The various boning may be of differing sizes as well. For example, the first boning may comprise a 22 inch length of boning, while the second boning and third boning may comprise 26 inch lengths. The first boning may lie along the pet opening edge 18. The second boning and third boning may lie along joinder bonds 24. In this manner, the central bed covering portion 10 may be impelled to stand with rigidity along some aspects, such as the pet opening edge 18 and the joinder bonding 24 joining the central bed covering portion 10 to the first wing portion 13 and the second wing portion 12. Consequently, the pet opening edge 18 may be supported so as to form an opening to permit pet entry and exit.

Moreover, the pet bed cover may be available in different sizes, for example, a large size, a medium size, and a small size, as desired for beds and/or pets of various sizes.

While in various embodiments, a three layer structure and/or a structure containing boning is contemplated, in further instances, a single layer may be contemplated and/or structure omitting boning is contemplated. For example, the outer sleeve comprising a structure bendable to enwrap a pet bed may comprise a single sheet having both an outer side 6 (FIG. 1) and an inner side 7 (FIG. 1). The inner insulation 5 (FIG. 1) may be omitted and/or may be an intrinsic aspect of the single sheet having both an outer side 6 (FIG. 1) and an inner side 7 (FIG. 1). In further instances, the inner side 7 (FIG. 1) may be one layer of material, the outer side 6 (FIG. 1) may be another layer of material, and an inner insulation 5 (FIG. 1) disposed there between may be a third layer of material.

Figure 15:
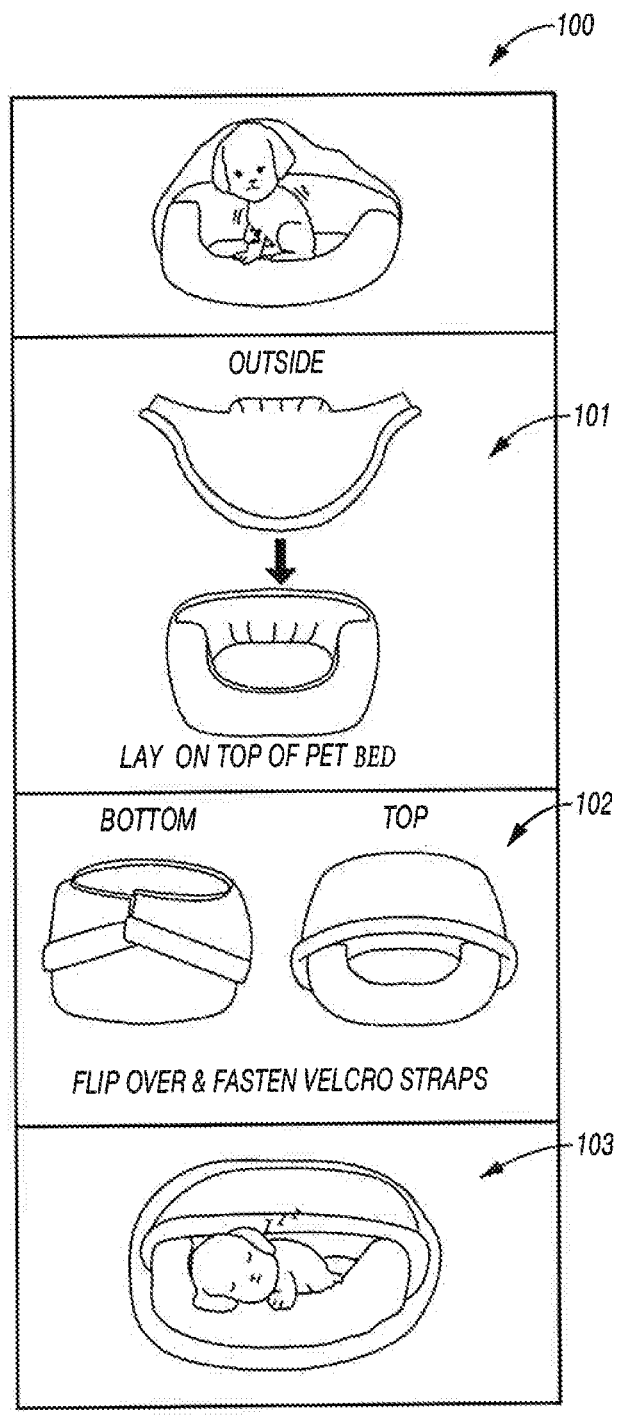
FIG. 15 illustrates a method of using a pet bed cover, according to various embodiments.

With momentary reference to FIG. 15, a pet bed cover may be provided in various colors. For instance, a first pet bed cover 3-1, a second pet bed cover 3-2, and a third pet bed cover 3-3 are depicted, each of the first through third pet bed cover 3-1, 3-2, 3-3, illustrated in a different color.

With ongoing reference to FIGS. 1-14, and with additional reference to FIG. 15, a method 100 of using a pet bed covering system 1 is disclosed. A pet bed cover 3 may be lowered atop a pet bed 2 (step 101). The pet bed cover 3 may be wrapped about the pet bed 2 (step 102). Subsequently, a pet may enter the pet bed covering system 1, disposed between the pet bed 2 and a portion of the pet bed cover 3 (step 103).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A pet bed cover comprising:
an outer sleeve comprising a structure bendable to enwrap a pet bed and comprising:
a pet opening edge configured to permit entry and exit of a pet from between the outer sleeve and the pet bed; and
a wing portion extending from the outer sleeve and extending around the pet bed, the wing portion having an outer side comprising outward side attachment features and having an inner side comprising inward side attachment features,
wherein at least a portion of the outward side attachment features mechanically interface with at least a portion of the inward side attachment features whereby the pet bed cover is configured to wrap about the pet bed.

2. The pet bed cover according to claim 1, wherein the structure bendable to enwrap the pet bed is an at least partially planar structure.

3. The pet bed cover according to claim 1,
wherein the wing portion comprises a first wing portion and a second wing portion,
wherein the outer side attachment features on the outer side are on the first wing portion,
wherein the inner side attachment features on the inner side are on the second wing portion, and
wherein the first wing portion and the second wing portion extend in opposite directions from the outer sleeve.

4. The pet bed cover according to claim 1, wherein the outer sleeve further comprises:
a central bed covering portion comprising a centrally disposed region of the outer sleeve arranged to provide cover to a pet bed.

5. The pet bed cover according to claim 1, wherein the outer sleeve further comprises an end wrap portion extending opposite the pet opening edge and configured to insulate an aft area of a pet bed.

6. The pet bed cover according to claim 1,
wherein the pet opening edge comprises a comfort overlay comprising at least one of a fleece, artificial fleece, and blanket covering at least a part of the pet opening edge and overlapping from a portion of the pet opening edge facing inwardly toward the pet bed to a portion of the pet opening edge facing outwardly from the pet bed.

7. The pet bed cover according to claim 1,
wherein the outward side attachment features comprise at least one outward side fastener strip, and
wherein the inward side attachment features comprise at least one inward side fastener strip, and wherein the at least one outward side fastener strip is selectably attachable to the at least one inward side fastener strip.

8. The pet bed cover according to claim 7,
wherein the inward side fastener strip is oriented to exhibit a relative angle relative to the pet opening edge,
wherein adjusting a degree of overlap of the inward side fastener strip and the outward side fastener strip adjusts a conical tightening of the pet bed without tensioning the pet opening edge.

9. The pet bed cover according to claim 1,
wherein the outward side attachment features comprise a plurality of outward side fastener strips, and
wherein the inward side attachment features comprise a plurality of inward side fastener strips, and
wherein at least one outward side fastener strip is selectably attachable to at least two of the plurality of inward side fastener strips, wherein the pet bed cover is configurable to fit different size pet beds.

10. The pet bed cover according to claim 1, further comprising:
joinder bonding comprising:
stitching affixing the central bed covering portion and the first wing portion together; and
boning whereby the joinder bonding of the central bed covering portion and the first wing portion is stiffened.

11. A method of making a pet bed cover comprising:
providing an outer sleeve comprising a structure bendable to enwrap a pet bed, wherein providing the outer sleeve further comprises:
providing a pet opening edge configured to permit entry and exit of a pet from between the outer sleeve and the pet bed;
providing a first wing portion and a second wing portion extending from the outer sleeve and extending around the pet bed, the first wing portion having an outer side and the second wing portion having an inner side,
providing outward side attachment features on the outer side of the first wing portion; and
providing inward side attachment features on the inner side of the second wing portion,
wherein at least a portion of the outward side attachment features mechanically interface with at least a portion of the inward side attachment features whereby the pet bed cover is configured to wrap about the pet bed in substantially fixed position relative to the pet bed.

12. The method of making a pet bed cover according to claim 11, wherein the providing the outer sleeve further comprises:
providing a central bed covering portion comprising a centrally disposed region of the outer sleeve arranged to provide cover to a pet bed; and
providing an end wrap portion extending opposite the pet opening edge and configured to insulate an aft area of a pet bed.

13. The method of making a pet bed cover according to claim 11, wherein providing the pet opening edge comprises:
providing a comfort overlay comprising at least one of a fleece, artificial fleece, and blanket covering at least a part of the pet opening edge and overlapping from a portion of the pet opening edge facing inwardly toward the pet bed to a portion of the pet opening edge facing outwardly from the pet bed.

14. The method of making a pet bed cover according to claim 11, wherein providing the outward side attachment features comprises providing at least one outward side fastener strip, wherein providing the inward side attachment features comprises providing at least one inward side fastener strip, and wherein the at least one outward side fastener strip is selectably attachable to the at least one inward side fastener strip.

15. The method of making a pet bed cover according to claim 14, wherein providing the inward side fastener strip comprises:

orienting the inward side fasteners strip to exhibit a relative angle relative to the pet opening edge wherein adjusting a degree of overlap of the inward side fastener strip and the outward side fastener strip adjusts a conical tightening of the pet bed.

16. The method of making the pet bed cover according to claim 15, wherein the adjusting the degree of overlap of the inward side fastener strip and the outward side fastener strip adjusts the conical tightening of the pet bed without tensioning the pet opening edge.

17. A pet bed cover comprising:

an outer sleeve comprising a structure bendable to enwrap a pet bed and comprising:

a pet opening edge configured to permit entry and exit of a pet from between the outer sleeve and the pet bed, an end wrap portion extending opposite the pet opening edge and configured to insulate an aft area of a pet bed.

18. The pet bed cover according to claim 17, wherein the outer sleeve further comprises:

a central bed covering portion comprising a centrally disposed region of the outer sleeve arranged to provide cover to the pet bed; and a wing portion extending from the outer sleeve and extending around the pet bed.

19. The pet bed cover according to claim 18, wherein the wing portion comprises a first wing portion and a second wing portion extending from opposite sides of the outer sleeve and extending around the pet bed.

20. The pet bed cover according to claim 19, wherein outward side attachment features are disposed on an outer side of the first wing, wherein inward side attachment features are disposed on an inner side of the second wing, and wherein at least a portion of the outward side attachment features mechanically interface with at least a portion of the inward side attachment features whereby the pet bed cover is configured to wrap about the pet bed.

* * * * *